US012651901B2

(12) United States Patent
Sun et al.

(10) Patent No.: US 12,651,901 B2
(45) Date of Patent: Jun. 9, 2026

(54) SURGE PROTECTOR AND SURGE PROTECTION METHOD

(71) Applicant: SEMICONDUCTOR COMPONENTS INDUSTRIES, LLC, Scottsdale, AZ (US)

(72) Inventors: Weiming Sun, Beijing (CN); Hai Lin, Beijing (CN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 149 days.

(21) Appl. No.: 18/465,088

(22) Filed: Sep. 11, 2023

(65) Prior Publication Data

US 2025/0087994 A1     Mar. 13, 2025

(51) Int. Cl.
*H02H 9/04* (2006.01)

(52) U.S. Cl.
CPC ..................................... *H02H 9/04* (2013.01)

(58) Field of Classification Search
CPC ................................. H02H 9/04; H02H 9/025
USPC .................................................... 361/56, 91.1
See application file for complete search history.

(56) References Cited

U.S. PATENT DOCUMENTS

| 3,594,612 | A | * | 7/1971 | Gately | ................... | H02H 3/202 |
| | | | | | | 327/310 |
| 4,008,418 | A | * | 2/1977 | Murphy | ................... | G05F 1/571 |
| | | | | | | 323/276 |

| 4,698,655 | A | * | 10/1987 | Schultz | .................. | H10D 18/00 |
| | | | | | | 361/103 |
| 5,359,233 | A | * | 10/1994 | Mumper | ................ | H03K 17/22 |
| | | | | | | 327/143 |
| 5,822,166 | A | * | 10/1998 | Massie | ................... | H02H 3/243 |
| | | | | | | 361/111 |
| 6,043,702 | A | * | 3/2000 | Singh | ............... | H03K 19/00315 |
| | | | | | | 327/309 |

(Continued)

FOREIGN PATENT DOCUMENTS

| CN | 107834850 | A | * | 3/2018 | ............ | H02M 3/158 |
| CN | 114063696 | A | * | 2/2022 | ............ | G05F 1/567 |

(Continued)

OTHER PUBLICATIONS

Onsemi Data Sheet FPF2281, "Over-Voltage Proection Load Switch," Sep. 2021—Rev. 3, 8 pages.

(Continued)

*Primary Examiner* — Dharti H Patel
(74) *Attorney, Agent, or Firm* — Ramey LLP; Daniel J. Krueger

(57) ABSTRACT

Illustrative surge protectors and surge protection methods provide accurate clamp level control during voltage transients and surge events. One illustrative surge protector includes: a shunt transistor having a source coupled to ground and a drain coupled to a conductor at a supply voltage; and an operational amplifier having: an output coupled to a gate of the shunt transistor, an inverting input coupled to a reference voltage Vref, and a noninverting input coupled to receive a sense voltage, the sense voltage being a fixed fraction f of the supply voltage, the operational amplifier being configured to drive the shunt transistor to shunt any excess current when the supply voltage reaches a clamp voltage $Vc=Vref/f$.

10 Claims, 3 Drawing Sheets

(56) References Cited

U.S. PATENT DOCUMENTS

| | | | | |
|---|---|---|---|---|
| 7,423,416 B1 * | 9/2008 | Quinones | ................... | G05F 3/18 |
| | | | | 327/542 |
| 8,059,432 B2 * | 11/2011 | Kraft | ................. | H02M 3/33507 |
| | | | | 323/299 |
| 8,537,517 B1 * | 9/2013 | Banak | .................... | H02H 9/025 |
| | | | | 361/93.1 |
| 9,876,349 B2 * | 1/2018 | Seberger | ................... | H02H 9/02 |
| 10,243,344 B2 * | 3/2019 | Nate | ..................... | H02M 3/155 |
| 11,170,964 B2 * | 11/2021 | Telefus | .................... | H02H 3/08 |
| 11,644,003 B2 * | 5/2023 | Irie | .......................... | F02P 17/12 |
| | | | | 123/644 |
| 11,695,272 B1 * | 7/2023 | Fang | .................... | H10D 89/811 |
| | | | | 361/118 |
| 11,855,452 B2 * | 12/2023 | Fan | ......................... | H02H 9/046 |
| 2003/0001552 A1 * | 1/2003 | Fujita | ...................... | H02M 3/07 |
| | | | | 323/288 |
| 2004/0212356 A1 * | 10/2004 | Dowlatabadi | ......... | H02M 3/156 |
| | | | | 323/282 |
| 2007/0145913 A1 * | 6/2007 | Nobiki | ..................... | H02M 1/36 |
| | | | | 315/291 |
| 2009/0079390 A1 * | 3/2009 | Choi | ......................... | H02J 7/54 |
| | | | | 320/122 |
| 2009/0219081 A1 * | 9/2009 | Kwon | .................... | G11C 5/145 |
| | | | | 327/536 |
| 2012/0198908 A1 * | 8/2012 | Warneck | ................ | G01R 15/04 |
| | | | | 73/1.01 |
| 2012/0250192 A1 * | 10/2012 | Naik | ........................ | H02H 9/08 |
| | | | | 361/42 |
| 2013/0100710 A1 * | 4/2013 | Kang | ..................... | H02H 7/125 |
| | | | | 361/118 |
| 2015/0303678 A1 | 10/2015 | Wang et al. | | |
| 2016/0049786 A1 * | 2/2016 | Kinzer | ................... | H02H 9/045 |
| | | | | 361/91.2 |
| 2016/0172850 A1 * | 6/2016 | Ellis-Monaghan | .... | H02H 9/046 |
| | | | | 361/56 |

| | | | | |
|---|---|---|---|---|
| 2016/0241023 A1 * | 8/2016 | Bentley | ................... | H02H 9/025 |
| 2017/0302066 A1 * | 10/2017 | Gao | ........................... | H03K 5/08 |
| 2017/0373490 A1 | 12/2017 | Zhu et al. | | |
| 2017/0373494 A1 * | 12/2017 | Pok | ........................... | H02H 9/046 |
| 2018/0138696 A1 | 5/2018 | Tang et al. | | |
| 2021/0223330 A1 * | 7/2021 | Yanamandra | ............ | H03K 5/24 |
| 2021/0242677 A1 * | 8/2021 | Langguth | ............. | H10D 89/819 |
| 2021/0389791 A1 * | 12/2021 | Liu | ............................ | G05F 3/22 |
| 2022/0128024 A1 * | 4/2022 | Irie | ........................... | F02P 11/02 |
| 2022/0181971 A1 * | 6/2022 | Mitev | ......................... | G05F 1/59 |
| 2022/0276692 A1 * | 9/2022 | Thibaut | ................... | G06F 1/329 |
| 2022/0311322 A1 * | 9/2022 | Hiasa | ................ | H02M 3/33507 |
| 2023/0099011 A1 * | 3/2023 | Das | ........................ | H03M 1/462 |
| | | | | 341/155 |
| 2023/0216292 A1 * | 7/2023 | Fang | ...................... | H02H 9/005 |
| | | | | 361/118 |
| 2024/0126316 A1 * | 4/2024 | Rizzo | ....................... | G05F 1/468 |
| 2024/0213796 A1 * | 6/2024 | Seike | ..................... | H02H 9/046 |
| 2025/0210090 A1 * | 6/2025 | Yang | .................... | G11C 7/1093 |

FOREIGN PATENT DOCUMENTS

| | | | | | | |
|---|---|---|---|---|---|---|
| CN | | 115051336 | A | * | 9/2022 | ............... H02H 9/04 |
| DE | | 102021101889 | A1 | * | 8/2021 | ........... H10D 89/911 |
| EP | | 2249450 | A2 | * | 11/2010 | ............. H02H 3/202 |
| EP | | 2290777 | A1 | * | 3/2011 | ............. H02H 9/042 |
| EP | | 2549613 | A1 | * | 1/2013 | ............. H02H 9/041 |
| EP | | 4325678 | A2 | * | 2/2024 | ............. H02H 9/041 |
| KR | | 101369154 | B1 | * | 3/2014 | ............. G05F 1/613 |
| TW | | 201218567 | A | * | 5/2012 | ............. H02H 9/041 |
| WO | WO-2024132545 | | A1 | * | 6/2024 | ............... H02J 7/35 |

OTHER PUBLICATIONS

ON Semiconductor Data Sheet FPF3380UCX, "28 V / 5 A Rated OVP with Low On-resistance and Integrated TVS," Sep. 2020—Rev. 2, 7 pages.

* cited by examiner

SURGE PROTECTOR AND SURGE PROTECTION METHOD

TECHNICAL FIELD

The present disclosure relates, in general, to surge protectors and transient voltage suppressors, and more particularly, to methods and designs that provide such protection with minimal area and energy requirements while enabling accurate clamp level control.

BACKGROUND

Many electronic devices employ power supplies that derive a direct current (DC) voltage from an alternating current (AC) power source such as, e.g., an electrical outlet connected to the electrical grid. The grid is large, complex, and subject to various events and failures that may cause the supplied voltage to exhibit surges and transients that can damage unprotected electronics. Thus, most electronic devices are equipped with protection against surges and transients, most typically in the form of transient voltage suppression (TVS) diodes. Such diodes may pose an undesirably large areal requirement to adequately limit the maximum voltage caused by a standard voltage surge test such as the one specified by the International Electrotechnical Commission standard IEC 61000-4-5 current impulse having an 8-microsecond front time and a 20-microsecond duration with a 40 ampere maximum, often abbreviated as "(8 µs/20 µs):40 A".

Various attempts have been made to address this issue, including US Pat. App. Pub. 2015/0303678 titled "Precision Surge Clamp with Constant Clamping Voltage and Near-Zero Dynamic Resistance under various Thermal, Power, and Current Levels", US Pat. App. Pub. 2017/0373490 titled "Surge Protection Circuit", and US Pat. App. Pub. 2018/0138696 titled "Surge Protection Circuit with Feedback Control". These attempts have been evaluated and found to exhibit significant and undesirable variation of the clamp voltage at different surge currents and at different temperatures.

SUMMARY

Accordingly, there are disclosed herein illustrative surge protectors and surge protection methods enabling accurate clamp level control during voltage transients and surge events. One illustrative surge protector includes: a shunt transistor having a source coupled to ground and a drain coupled to a conductor at a supply voltage; and an operational amplifier having: an output coupled to a gate of the shunt transistor, an inverting input coupled to receive a reference voltage Vref, and a noninverting input coupled to receive a sense voltage, the sense voltage being a fixed fraction f of the supply voltage, the operational amplifier being configured to drive the shunt transistor to shunt any excess current when the supply voltage reaches a clamp voltage Vc=Vref/f.

An illustrative surge protection method includes: deriving a sense voltage that is a fixed fraction f of a supply voltage (e.g., using the voltage divider 208); comparing the sense voltage to a reference voltage Vref (e.g., using the operational amplifier 204); and based on the comparison, driving a transistor to shunt any excess current when the supply voltage reaches a clamp voltage Vc=Vref/f (e.g., by the operational amplifier 204).

An illustrative method for providing surge protection includes: providing a shunt transistor configured to couple a conductor at a supply voltage to ground when the shunt transistor is enabled; coupling an output of an operational amplifier to a gate of the shunt transistor; coupling a reference voltage from a reference circuit to a inverting input of the operational amplifier; and coupling a sense voltage from a voltage divider to a noninverting input of the operational amplifier, the sense voltage being a fixed fraction f of the supply voltage, the operational amplifier being configured to enable the shunt transistor to shunt any excess current when the supply voltage reaches a clamp voltage Vc=Vref/f.

Each of the foregoing surge protectors and surge protection methods can be employed individually or in conjunction and may include one or more of the following features in any suitable combination: 1. the operational amplifier includes a differential amplifier. 2. a power controller configured to disable the differential amplifier when the supply voltage is below a threshold voltage. 3. a voltage divider configured to provide the sense voltage to the noninverting input. 4. the voltage divider includes a first impedance in series with a second impedance, the first impedance formed by a first resistance in parallel with a first capacitance, and the second impedance formed by a second resistance in parallel with a second capacitance. 5. a power controller configured to disable the voltage divider when the supply voltage is below a threshold voltage. 6. a reference circuit that comprises a reverse-biased Zener diode driven by a current source. 7. a power controller configured to disable the reference circuit when the supply voltage is below a threshold voltage. 8. the threshold voltage is matched to the clamp voltage Vc. 9. the threshold voltage is set by a series combination of Zener diodes and a current mirror transistor.

DETAILED DESCRIPTION

The following description and accompanying drawings are provided for explanatory purposes, not to limit the disclosure. To the contrary, they provide the foundation for one of ordinary skill in the art to understand all modifications, equivalents, and alternatives falling within the scope of the claims.

Figure 1:
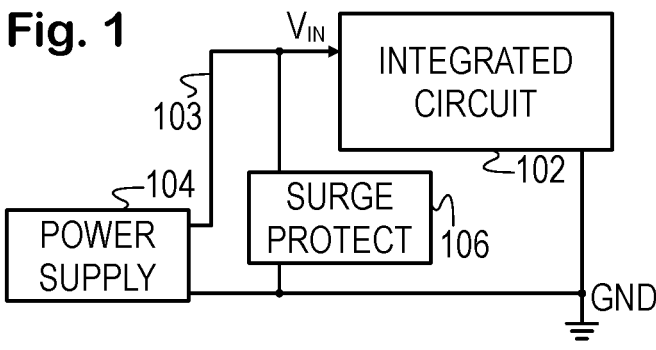
FIG. 1 is a block diagram of an illustrative electronic device.

FIG. 1 is a block diagram of an illustrative electronic device including an integrated circuit 102 coupled via a conductor 103 to a power supply 104 to receive a DC supply voltage Vin. Typical examples of Vin would include 3V, 5V, 6V, 9V, 12V, 15V, 16V, and 24V, but higher and lower values are possible. A surge protector 106 is coupled between conductor 103 and ground to limit the supply voltage to a maximum value. Surge protector 106 is configured to suppress fast voltage transients as well as more prolonged voltage surges, including at least standard IEC 61000-4-5 (8 µs/20 µs):40 A current surges.

The surge protector 106 may be integrated onto the same substrate or into the same multi-chip module as the integrated circuit 102. Alternatively, the surge protector 106 may be integrated into the power supply circuitry responsible for converting AC voltage into the DC supply voltage. As yet another alternative, the surge protector 106 may be packaged as a discrete component to be mounted with the integrated circuit 102 on a printed circuit board or otherwise wired between the power supply rails for the integrated circuit.

Figure 2:
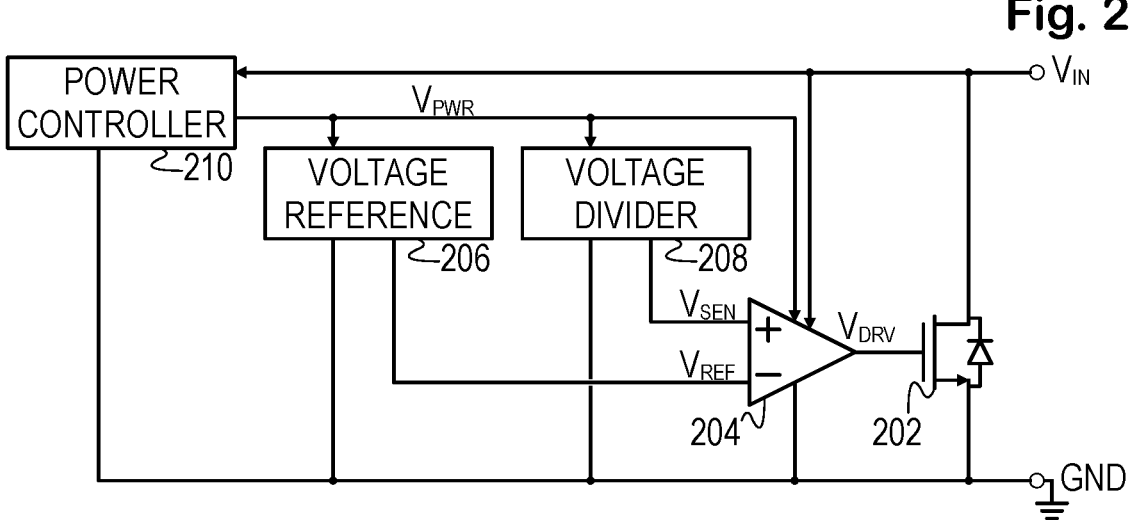
FIG. 2 is a block diagram of an illustrative surge protector.

FIG. 2 shows a block diagram of an illustrative implementation for surge protector 106. The surge protector includes a shunt transistor 202 configured to shunt excess current from conductor 103 to ground when the supply voltage reaches a clamp voltage Vc, thereby preventing the supply voltage from exceeding the clamp voltage Vc during a surge event. The "excess current" is that portion of the current not being consumed by the load, which if not shunted to ground would further raise the voltage of conductor 103. In FIG. 2, the shunt transistor is shown as a power metal oxide semiconductor field effect transistor having an n-type channel (power n-MOSFET), with its source connected to ground and its drain connected to the supply voltage conductor. Such transistors conduct when their gate-to-source voltage is raised above a threshold voltage, which can be tailored to the application but may typically be on the order of 2 volts. MOSFETs may be particularly desirable for the shunt transistor due to their fast response and negligible leakage current, but other transistor types may also be suitable including bipolar junction transistors and junction-gate field effect transistors.

The shunt transistor's gate is coupled to the output of an operational amplifier 204 to receive a drive signal Vdrv. Operational amplifier 204 has an inverting input coupled to a reference circuit 206 to receive a reference voltage Vref, and a noninverting input coupled to a voltage divider 208 to receive a sense voltage Vsen. The drive signal Vdrv is low when the sense voltage Vsen is below the reference voltage Vref, maintaining the shunt transistor in a nonconducting "OFF" state. When the sense voltage Vsen reaches the reference voltage Vref, the operational amplifier 204 drives the shunt transistor 202 to a conducting "ON" state to shunt excess current for so long as the sense voltage is at or above the reference voltage.

Reference circuit 206 may be any suitable type of reference voltage generator that provides a reference voltage largely independent of temperature, supply voltage, and process variations, including bandgap voltage references, Zener diode references, avalanche diode references, and $V_{BE}$ multiplier references. As discussed further below, the reference circuit 206 is disabled in the absence of a surge event and consequently need not be designed to minimize power consumption particularly if such a design unnecessarily increases complexity or the physical area required to implement the circuit.

Voltage divider 208 derives the sense voltage Vsen as a fixed fraction f of the supply voltage Vin. The term "fixed" is employed here to indicate that the fraction f is constant and does not depend on the supply voltage. Any dependence on temperature or process variation is also expected to be negligible. Voltage dividers in general can incorporate capacitive and/or inductive elements to make the fraction f a complex number having a frequency-dependent magnitude, but the illustrative implementation employs a voltage divider that provides a real-valued fraction f with no significant frequency dependence. An illustrative range for f would be 0.1 to 0.8, and as will become apparent from the discussion below the precise value chosen would balance various considerations including the relationship between Vin (the source voltage for the operational amplifier 204) and the desired clamp voltage, as well as the availability of a reference circuit 206 to provide a suitable reference voltage.

Because the sense voltage Vsen is not permitted to exceed the reference voltage Vref, the clamp voltage Vc can be derived as:

$$V_{sen} = fV_{in} \leq V_{ref}$$
$$V_{in} \leq V_{ref}/f = V_c$$

The reference voltage Vref may be determined by the design of the reference circuit 206, and the voltage divider 208 may be designed to provide the fraction f that sets the clamp voltage Vc at the desired value.

The illustrative implementation further includes a power controller 210. Power controller 210 provides the supply voltage Vin as a power voltage Vpwr to the operational amplifier 204, reference circuit 206, and voltage divider 208, when supply voltage Vin is above a threshold voltage, and otherwise decouples the supply voltage Vin from these components when the supply voltage Vin is below the threshold voltage. The threshold voltage is preferably matched to the clamp voltage Vc, meaning that the threshold voltage is below, but nearly equal to, the clamp voltage Vc so that components 204-208 are enabled only when they are likely to be needed. The gap between the desired threshold voltage and the desired clamp voltage may be large enough to ensure that under expected process and parameter variations the threshold voltage is guaranteed to be less than the clamp voltage, e.g., a 2-4 volt gap.

Though an n-channel transistor is shown in the illustrative implementation, a p-channel transistor can also serve as a shunt transistor with a reversal of source and drain connections and a corresponding adjustment of the gate signal voltage, which can be achieved by swapping the operational amplifier's inverting and noninverting inputs.

Figure 3:
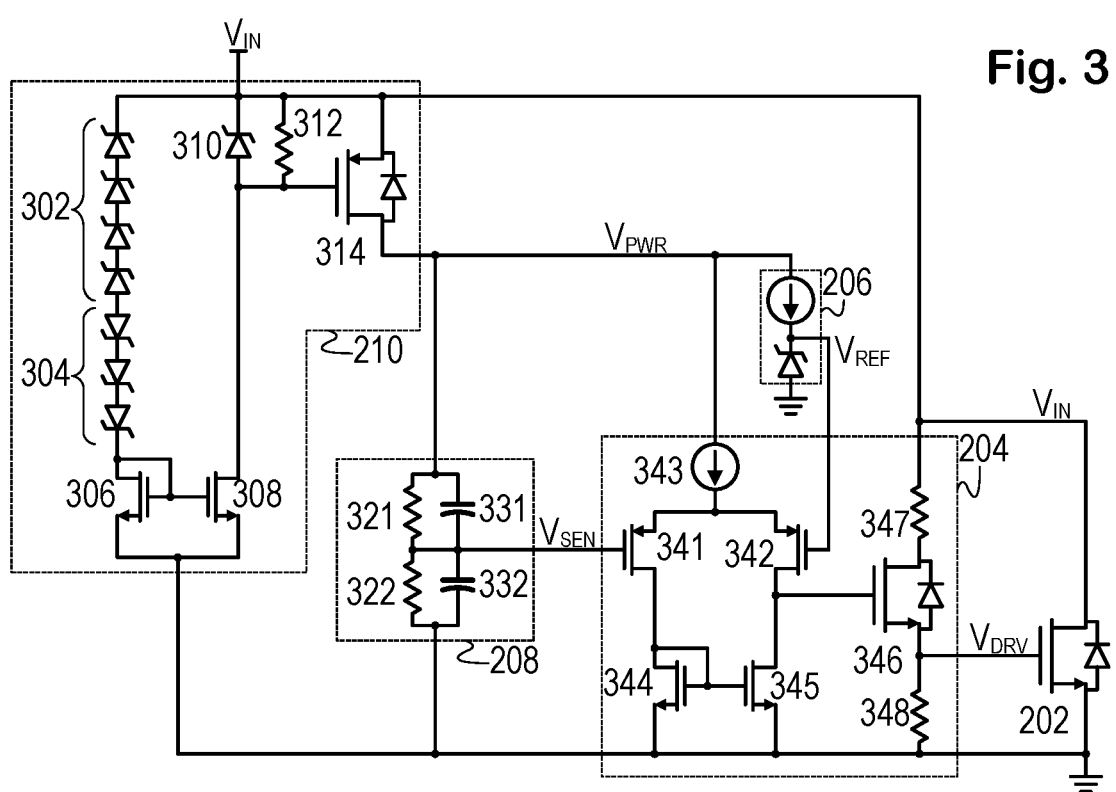
FIG. 3 is a circuit schematic of an illustrative surge protector.

FIG. 3 is a circuit schematic of one illustrative implementation of surge protector 106. In FIG. 3, the power controller includes a set of reverse-biased Zener diodes 302 in series with a set of forward-biased Zener diodes 304, the series combination forming a diode arrangement that enables current to flow only after the supply voltage reaches a threshold voltage level. The reverse-biased Zener diodes 302 have a breakdown voltage that increases with increasing temperature, while the forward-biased Zener diodes 304 have a forward conduction voltage that decreases with temperature. The diode arrangement can be designed so that these temperature dependences cancel, so that the series combination of Zener diodes provides a consistent threshold voltage across a wide temperature range.

The diode arrangement couples the supply voltage Vin to the gate and drain of an n-type transistor 306 that has its source coupled to ground. Transistor 306 translates the current flowing through the diode arrangement into a corresponding gate voltage. A matched transistor 308 acts as a current mirror transistor, i.e., it is placed in a current mirror arrangement with transistor 306 to translate the gate voltage to a corresponding current flow through a bias diode 310, shown here as a reverse-biased Zener diode, creating a voltage drop between the source and gate of a p-type power transistor 314, coupling the supply voltage Vin to the power voltage Vpwr. In the absence of a current flow through the current mirror, a pull up resistance 312 pulls the gate voltage of power transistor 314 to the supply voltage, decoupling the power voltage Vpwr from the supply voltage Vin. The diode arrangement in combination with the transistor 306 provides a customizable threshold voltage such as about 22 volts. As previously mentioned, the power controller 210 couples the supply voltage Vin to the other components 204-208 when the supply voltage exceeds the threshold voltage.

The voltage divider 208 includes a first resistance 321 in parallel with a first capacitance 331 to create a first impedance, and a second resistance 322 in parallel with a second capacitance 332 to form a second impedance. The first impedance and the second impedance are in series between the power voltage Vpwr and ground, with an intermediate node that provides the sense voltage Vsen:

$$V_{sen} = V_{pwr} \frac{Z_2}{Z_1 + Z_2}$$

where $Z_1$ and $Z_2$ are the first and second impedances, respectively, chosen to provide a real-valued fraction f. The impedance of power transistor 314 is expected to be negligible, but if it is too large to be ignored, it may be included as part of the first impedance when expressing the sensing voltage in terms of the source voltage:

$$V_{sen} = V_{in} \frac{Z_2}{Z_1 + Z_2}$$

In at least one contemplated implementation, the first and second impedances are integer multiples of a base impedance Z, e.g., $Z_1 = mZ$ and $Z_2 = nZ$, where m and n are integers. (The base impedance Z may be the impedance of power transistor 314 in the conducting state.) The sense voltage can then be expressed:

$$V_{sen} = \frac{n}{m + n} V_{in} = fV_{in}$$

where f is the fixed fraction defined by the voltage divider 208.

Reference circuit 206 includes a current source enabled by the power voltage Vpwr. The current source provides a current flow through a reverse-biased Zener diode to generate the reference voltage Vref. This Zener diode (and the power controller's Zener diode 310) may be diodes with a 5.6-volt breakdown voltage, where the temperature coefficient of the avalanche breakdown process cancels the temperature coefficient of the Zener breakdown process, minimizing any temperature dependence of the reference voltage.

Operational amplifier 204 includes a differential transistor pair 341, 342 driven by a current source 343. Transistors 341, 342 are shown as p-type MOSFETs with their sources connected to the current source 343. The drain of transistor 341 is coupled to the drain and gate of an n-type MOSFET 344, translating the current flow through transistor 341 into a gate voltage for current mirror transistor 345. The gate of transistor 341 receives the sense voltage Vsen and the gate of transistor 342 receives the reference voltage Vref. As long as the sense voltage Vsen is less than the reference voltage Vref, the current from current source 343 is steered primarily through transistors 341 and 344. Transistor 342 passes less current flow than current mirror transistor 345, discharging the gate of output transistor 346. With output transistor 346 in a nonconducting state, pull down resistance 348 pulls the drive voltage Vdrv low. In this situation, the shunt transistor 202 is off.

When the sense voltage Vsen reaches or exceeds the reference voltage Vref, the current from current source 343 is steered through transistors 342 as current mirror transistor 345 draws less current, charging the gate of output transistor 346. With output transistor 346 in the conducting state, pull up resistance 347 pulls the drive voltage Vdrv high. In this situation, the shunt transistor 202 is in a conducting state, enabling excess current to be drawn from the supply voltage Vin, and thereby providing accurate feedback control of the supply voltage.

Figure 4:
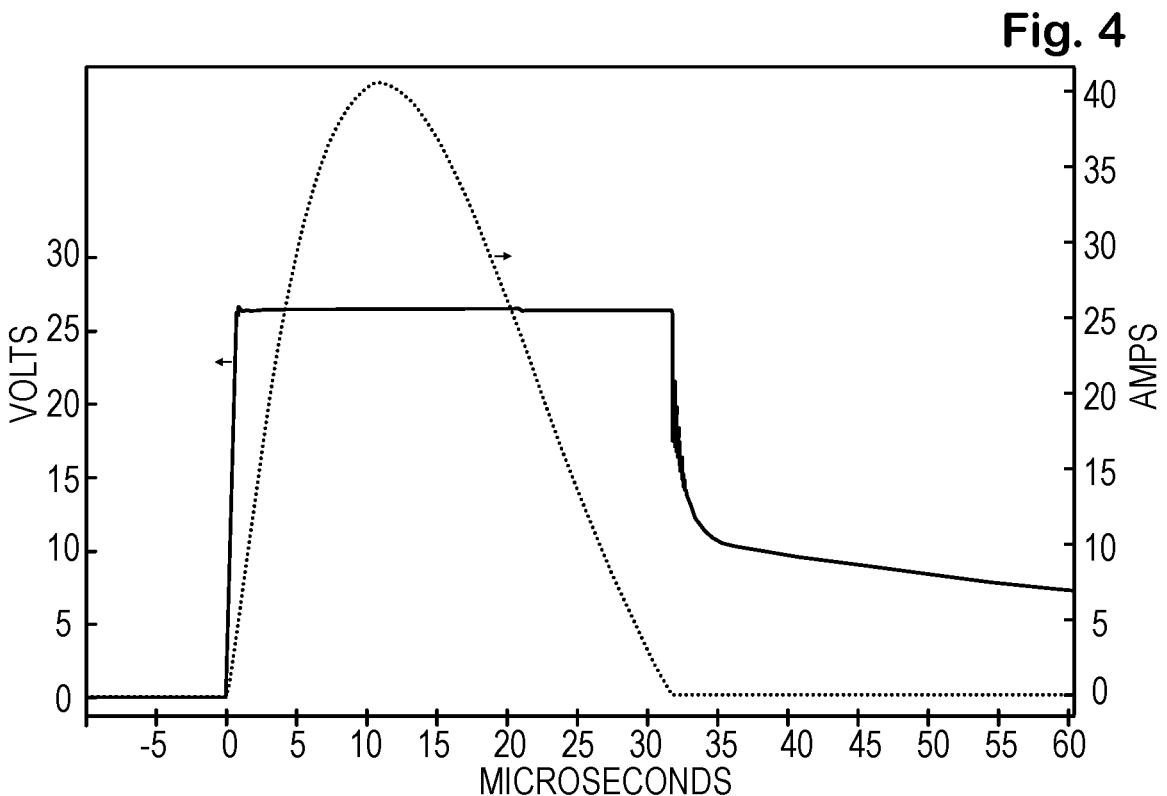
FIG. 4 is graph of supply voltage and shunt current during an illustrative surge event.

FIG. 4 is a graph showing the supply voltage Vin as a function of time during a standard IEC 61000-4-5 (8 μs/20 μs):40 A surge event. The solid line demonstrates a fast voltage rise from zero to a clamp voltage of 26.5 volts, where it is capped by shunting the excess current as indicated by the broken line. Once the excess current has been shunted at about 32 microseconds, the voltage falls below the cap and the shunt transistor shuts off, enabling the voltage to decay gradually thereafter. The surge protector exhibits a dynamic resistance of 1 milliohm at 27 C, and the maximum supply voltage is 26.8 volts when the shunt current peaks at 40 A. Over a range of temperature and parameter variations, the surge protector performed well, limiting the supply voltage to a maximum of 27.99 volts with a dynamic resistance of 7.9 milliohms, representing a substantial improvement over previous approaches. Measured current leakage after the power controller disables the power voltage Vpwr was about 4 nA, and the measured input capacitance was 106 pF. The expected footprint (areal requirement) for the surge protector is no more than about 1.1 mm×1.1 mm.

Figure 5:
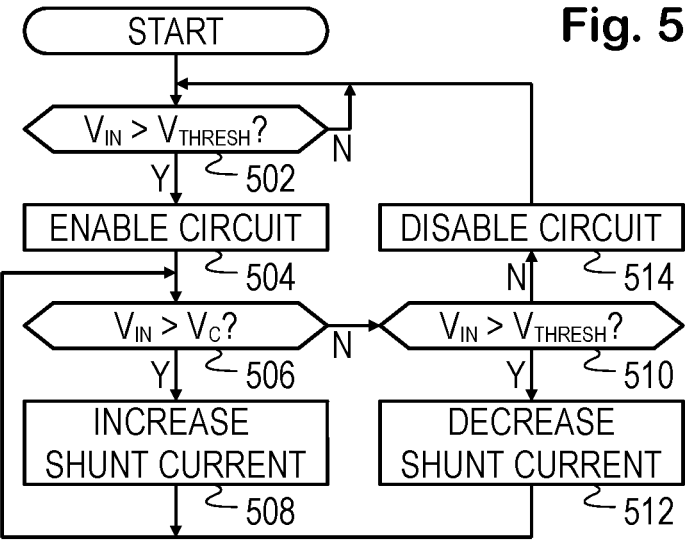
FIG. 5 is a flow diagram of an illustrative surge protection method.

FIG. 5 is a flow diagram of a method that may be implemented by the surge protector 106. In block 502, the surge protector, and more precisely, the power controller 210, loops until it determines that the supply voltage is above a threshold. When the threshold is exceeded, the power controller 210 enables various circuit components (e.g., reference circuit 206, voltage divider 208, and operational amplifier 204) of the surge protector 106 in block 504. In block 506, the operational amplifier 204 determines whether the supply voltage is exceeding the clamp voltage. If so, the drive voltage is increased to increase the shunt current through the shunt transistor 202 in block 508, and the method returns to block 506. If the supply voltage does not exceed the clamp voltage, then the power controller 210 determines in block 510 whether the supply voltage remains above the threshold. If so, i.e., if the supply voltage is between the threshold and clamp voltages, then in block 512, the operational amplifier 204 decreases the drive voltage to reduce the shunt current and loops back to block 506. On the other hand, if the supply voltage has fallen below the threshold voltage, then in block 514 the power controller 210 disables the other circuit components of the surge protector 106 and returns to block 502.

Though for clarity the method is shown and described as a sequence of operations, in practice the various operations may be implemented concurrently and asynchronously by different components of the surge protector. The method may be implemented as application specific integrated circuitry or as an assembly of discrete electronic components. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A surge protector that comprises: a shunt transistor having a source coupled to ground and a drain coupled to a conductor at a supply voltage;

a voltage divider configured to provide a sense voltage that is a fixed fraction f of the supply voltage;

a power controller configured to disable the voltage divider when the supply voltage is below a threshold voltage;

an operational amplifier having: an output coupled to a gate of the shunt transistor, an inverting input coupled to receive a reference voltage Vref provided by a reference circuit, and a noninverting input coupled to receive the sense voltage, the operational amplifier being configured to drive the shunt transistor to shunt any excess current through the shunt transistor when the supply voltage reaches a clamp voltage Vc=Vref/f, wherein the power controller is configured to disable the reference circuit when the supply voltage is below the threshold voltage, wherein the threshold voltage is matched to the clamp voltage Vc.

2. The surge protector of claim 1, wherein the operational amplifier includes a differential amplifier, and wherein the power controller is configured to disable the differential amplifier when the supply voltage is below the threshold voltage.

3. The surge protector of claim 1, wherein the voltage divider includes a first impedance in series with a second impedance, the first impedance formed by a first resistance in parallel with a first capacitance, and the second impedance formed by a second resistance in parallel with a second capacitance.

4. The surge protector of claim 1, wherein the reference circuit that comprises a reverse-biased Zener diode driven by a current source.

5. The surge protector of claim 1, wherein the threshold voltage is set by a series combination of Zener diodes and a current mirror transistor.

6. A surge protection method that comprises:

using a voltage divider to derive a sense voltage that is a fixed fraction f of a supply voltage;

comparing the sense voltage to a reference voltage Vref provided by a reference circuit;

based on the comparison, driving a transistor to shunt any excess current through the transistor when the supply voltage reaches a clamp voltage Vc=Vref/f; and disabling the voltage divider when the supply voltage is below a threshold voltage;

disabling the reference circuit when the supply voltage is below the threshold voltage, wherein the threshold voltage is matched to the clamp voltage Vc.

7. The surge protection method of claim 6, wherein the comparing is performed by a differential amplifier, and wherein the method further comprises disabling the differential amplifier when the supply voltage is below the threshold voltage.

8. The surge protection method of claim 6, wherein the reference voltage is provided by the reference circuit having a reverse-biased Zener diode driven by a current source.

9. A surge protection method that comprises: providing a shunt transistor configured to couple a conductor at a supply voltage to ground when the shunt transistor is enabled;

coupling an output of an operational amplifier to a gate of the shunt transistor;

coupling a reference voltage from a reference circuit to an inverting input of the operational amplifier;

coupling a sense voltage from a voltage divider to a noninverting input of the operational amplifier, the sense voltage being a fixed fraction f of the supply voltage, the operational amplifier being configured to enable the shunt transistor to shunt any excess current through the shunt transistor when the supply voltage reaches a clamp voltage Vc=Vref/f; and providing a power controller configured to disable the operational amplifier, the reference circuit, and the voltage divider, when the supply voltage is below the threshold voltage, wherein the threshold voltage is matched to the clamp voltage Vc.

10. The surge protection method of claim 9, wherein the voltage divider includes a first impedance in series with a second impedance, the first impedance formed by a first resistance in parallel with a first capacitance, and the second impedance formed by a second resistance in parallel with a second capacitance, a ratio between the first and second impedances being real-valued.

* * * * *